(12) United States Patent
Bodkin et al.

(10) Patent No.: US 9,347,832 B2
(45) Date of Patent: May 24, 2016

(54) OPTICAL SYSTEMS AND METHODS EMPLOYING A POLARIMETRIC OPTICAL FILTER

(71) Applicant: Bodkin Design And Engineering LLC, Newton, MA (US)

(72) Inventors: Andrew Bodkin, Dover, MA (US); James T. Daly, Mansfield, MA (US)

(73) Assignee: Bodkin Design And Engineering LLC, Newton, MA (US)

( * ) Notice: Subject to any disclaimer, the term of this patent is extended or adjusted under 35 U.S.C. 154(b) by 201 days.

(21) Appl. No.: 14/025,224

(22) Filed: Sep. 12, 2013

(65) Prior Publication Data

US 2014/0009757 A1 Jan. 9, 2014

Related U.S. Application Data

(60) Continuation of application No. 13/544,764, filed on Jul. 9, 2012, now abandoned, which is a division of application No. 12/467,167, filed on May 15, 2009, now abandoned.

(60) Provisional application No. 61/053,607, filed on May 15, 2008, provisional application No. 61/150,610, filed on Feb. 6, 2009.

(51) Int. Cl.
  *G01J 4/04* (2006.01)
  *G01J 3/28* (2006.01)
  *G01J 3/51* (2006.01)
  *G01J 11/00* (2006.01)
  *G01J 3/02* (2006.01)

(52) U.S. Cl.
  CPC ................ *G01J 4/04* (2013.01); *G01J 3/2823* (2013.01); *G01J 3/0224* (2013.01); *G01J 3/51* (2013.01); *G01J 11/00* (2013.01); *G01J 2003/2826* (2013.01)

(58) Field of Classification Search
  CPC ........... G01J 3/2846; G01J 3/51; G01J 3/447; G01J 11/00; G01J 3/0224; G01J 3/2823; G01J 4/04
  See application file for complete search history.

(56) References Cited

U.S. PATENT DOCUMENTS 4,227,208 A * 10/1980 Takanashi et al. ............ 359/890
4,575,193 A *  3/1986 Greivenkamp, Jr. ...... 359/489.07
4,626,897 A * 12/1986 Sato et al. ...................... 348/273

(Continued)

OTHER PUBLICATIONS

Select File History from related U.S. Appl. No. 12/467,167, dated Sep. 3, 2009 through Nov. 23, 2012, 21 pages.

(Continued)

*Primary Examiner* — Bao-Luan Le
(74) *Attorney, Agent, or Firm* — Lathrop & Gage LLP

(57) ABSTRACT

A birefringent filter includes an EM directing element in optical alignment with a first surface of the birefringent plate. A polarimetric imager includes a birefringent filter including a birefringent plate formed of a birefringent material and an EM directing element in optical alignment with a first surface of the birefringent plate. The imager further includes a detector in optical alignment with a second surface of the birefringent plate. A projection system includes an EM directing element and a birefringent filter. The filter includes (1) a birefringent plate formed of a birefringent material and having a first surface in optical alignment with the emissions source, and (2) an EM directing element in optical alignment with a second surface of the birefringent plate.

21 Claims, 12 Drawing Sheets

(56) References Cited

U.S. PATENT DOCUMENTS

| | | | |
|---|---|---|---|
| 4,732,480 A * | 3/1988 | Fortunato et al. | 356/453 |
| 4,732,481 A * | 3/1988 | Matsui et al. | 356/453 |
| 4,814,604 A * | 3/1989 | Lequime | 250/227.21 |
| 5,438,414 A * | 8/1995 | Rust | 356/364 |
| 5,737,298 A | 4/1998 | Suhan | |
| 6,137,619 A | 10/2000 | Chen et al. | |
| 6,455,841 B2 * | 9/2002 | Zhou et al. | 250/225 |
| 6,512,615 B2 * | 1/2003 | Wu et al. | 398/87 |
| 6,527,393 B1 | 3/2003 | Ogawa | |
| 6,545,779 B1 * | 4/2003 | Liu et al. | 398/14 |
| 6,631,001 B2 * | 10/2003 | Kuiseko | 356/456 |
| 6,639,683 B1 * | 10/2003 | Tumbar et al. | 356/521 |
| 7,038,776 B1 | 5/2006 | Ansley et al. | |
| 7,115,849 B2 * | 10/2006 | Dowski et al. | 250/201.9 |
| 7,274,440 B1 | 9/2007 | Janik et al. | |
| 7,298,480 B2 | 11/2007 | Garcia-Caurel et al. | |
| 7,599,067 B2 * | 10/2009 | Walmsley et al. | 356/450 |
| 7,649,626 B2 * | 1/2010 | Harvey et al. | 356/326 |
| 7,732,750 B2 * | 6/2010 | Dowski et al. | 250/216 |
| 9,046,422 B2 * | 6/2015 | Kudenov | |
| 2003/0136894 A1 | 7/2003 | Gerlach | |
| 2003/0142318 A1 * | 7/2003 | Kuiseko | 356/456 |
| 2005/0174573 A1 * | 8/2005 | Harvey et al. | 356/328 |
| 2005/0264813 A1 | 12/2005 | Giakos | |
| 2006/0215054 A1 | 9/2006 | Liang et al. | |
| 2007/0030551 A1 * | 2/2007 | Oka et al. | 359/237 |
| 2007/0296958 A1 * | 12/2007 | Zou et al. | 356/73 |
| 2008/0212103 A1 * | 9/2008 | Walmsley et al. | 356/450 |

OTHER PUBLICATIONS

Select File History from related U.S. Appl. No. 13/544,764, dated Dec. 5, 2012 through Nov. 7, 2013, 22 pages.

* cited by examiner

OPTICAL SYSTEMS AND METHODS EMPLOYING A POLARIMETRIC OPTICAL FILTER

CROSS REFERENCE TO RELATED APPLICATIONS

This application is a continuation of co-pending U.S. patent application Ser. No. 13/544,764, filed Jul. 9, 2012, which is a divisional of U.S. patent application Ser. No. 12/467,167, filed May 15, 2009, which claims benefit of priority to U.S. Provisional Patent Application No. 61/053,607, filed May 15, 2008, and to U.S. Provisional Patent Application No. 61/150,610, filed Feb. 6, 2009. Each of the above identified patent applications is incorporated herein by reference.

BACKGROUND

Passive imaging is a key technique for target detection, discrimination, and classification. Advances in imaging, spectral analysis, and active ranging now exploit larger regions of the electromagnetic spectrum from the ultraviolet ("UV") region to the very long wave infrared ("VLWIR") region to identify and separate targets from backgrounds and decoys. Existing imaging systems may detect electromagnetic wavelength, phase front, and time-of-flight to extract signatures of targets. However, one electromagnetic wave physical property that is not being fully exploited using existing technology is wave polarization state. Polarimetry, which is the measurement and interpretation of the polarization of electromagnetic waves, has potential applications such as target discrimination, buried mine detection, hidden object detection, measurement of sugar content in foods, purity measurement of pharmaceutical materials, and measurement of blood glucose.

Polarization of an electromagnetic wave can be characterized using a polarimetric imager. One existing polarimetric imager uses a polarizing beam-splitter and two cameras. Such imager suffers from the expense and space required to provide two cameras and the difficulty in spatially and temporally registering or aligning images from the two cameras. This imager also does not measure circular polarization.

Another existing polarimetric imager uses a rotating linear polarizer to acquire successive images at different polarizations. However, this imager requires significant time to scan the various polarizations, which may result in generation of artifacts due to motion of the target or camera, even from a leaf blowing in the wind.

A more recently developed polarimetric imager uses a "micropolarizer array". This imager measures four separate linear polarizations (0°, 90°, +45°, −45° on adjacent pixels, which are not coincident, and also reduces spatial resolution by four to one. Additionally, it may be difficult to align this imager with its focal plane array. Furthermore, this imager does not measure circular polarization.

SUMMARY

In an embodiment, a birefringent filter for separating rays of light incident thereon into ordinary rays and extraordinary rays includes a birefringent plate formed of a birefringent material. The filter further includes an EM directing element in optical alignment with a first surface of the birefringent plate.

In an embodiment, a polarimetric imager for simultaneously generating two orthogonally polarized images of a scene includes a birefringent filter for separating rays of light from the scene into ordinary rays and extraordinary rays. The filter includes a birefringent plate formed of a birefringent material and an EM directing element in optical alignment with a first surface of the birefringent plate. The imager further includes a detector in optical alignment with a second surface of the birefringent plate, for simultaneously generating a first image of the scene from the ordinary rays and a second image of the scene from the extraordinary rays.

In an embodiment, a projection system includes an electromagnetic energy emissions source and a birefringent filter. The filter includes (1) a birefringent plate formed of a birefringent material and having a first surface in optical alignment with the emissions source, and (2) an EM directing element in optical alignment with a second surface of the birefringent plate.

DETAILED DESCRIPTION OF THE EMBODIMENTS

Figure 1:
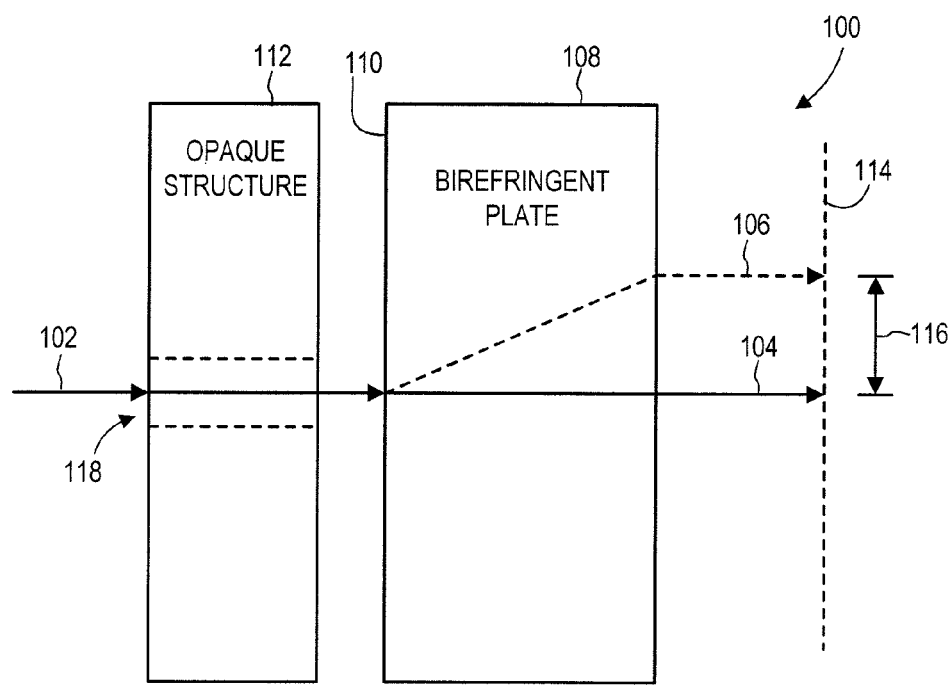
FIG. 1 shows one birefringent filter, according to an embodiment.

It is noted that, for purposes of illustrative clarity, certain elements in the drawings may not be drawn to scale. Specific instances of an item may be referred to by use of a numeral in parentheses (e.g., slit 318(1)) while numerals without parentheses refer to any such item (e.g., slits 318).

FIG. 1 shows one birefringent filter 100 including a birefringent plate 108 and an electromagnetic energy ("EM") directing element, such as an opaque structure 112 as shown in FIG. 1, in optical alignment with a surface 110 of plate 108. Although FIG. 1 shows opaque structure 112 displaced from birefringent plate 108, these two elements could be combined (e.g., laminated together). Opaque structure 112 includes a plurality of apertures 118 (only one is shown in FIG. 1 for illustrative clarity) allowing rays 102 to reach surface 110.

Although filter 100 is generally described herein as including opaque structure 112 as an EM directing element, another EM directing element could supplement and/or replace opaque structure 112. For example, a lens array could be used as an EM directing element in place of, or in addition to, opaque structure 112.

Birefringent plate 108 is formed of a birefringent material. Birefringence is a property of certain materials where two polarization states have different indexes of refraction, ordinary and extraordinary. The ordinary index of refraction follow Snell's law of refraction while the extraordinary index of refraction does not. These birefringent material properties cause an orthogonally polarized optical ray traveling therethrough to split into two polarization states and refract at different angles. Accordingly, plate 108 separates incident rays of light 102 into ordinary rays 104 (s-polarization, polarized in a plane perpendicular to the plane of the page) and extraordinary rays 106 (p-polarization, polarized in the plane of the page). Ordinary rays 104 and extraordinary rays 106 may be re-imaged via a lens system (not shown) onto a focal plane 114, which, for example, includes a detector, photographic film, or a projection screen. Birefringent plate 108 could optionally be formed of two birefringent plates laminated together to create a Savart plate, which has twice the deviation properties of a single birefringent plate.

The resulting image on focal plane 114 includes sets of image pairs, where each image pair has passed through the same aperture in opaque structure 112. One of the images of a pair is p-polarized, while the other image of the pair is s-polarized. Thus, filter 100 advantageously can be used to create two orthogonally polarized images on focal plane 114. Opaque structure 112 serves to space apart rays 102 incident on surface 110 to prevent image pairs from overlapping, thereby permitting interlacing. If opaque structure 112 were not present, an ordinary ray 104 might overlap an adjacent extraordinary ray 106 on focal plane 114. Accordingly, apertures 118 of opaque structure 112 have, for example, a spacing at least as great as a separation 116 (after magnification) between a pair of ordinary and extraordinary rays emerging from birefringent plate 108. A lens array or other EM directing element could optionally be used in place of opaque structure 112 to separate rays 102 incident on surface 110. Furthermore, in one embodiment, filter 100 does not have opaque structure 112 or any other EM directing element at all; removal of overlap from focal plane 114 is instead accomplished via image processing techniques.

Figure 1A:
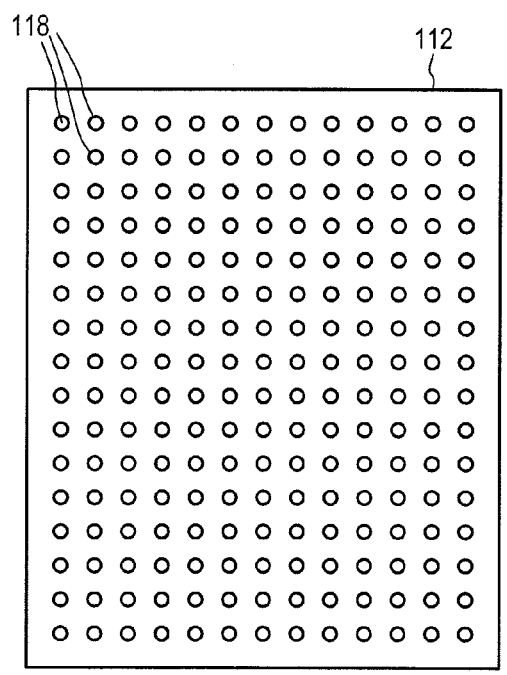
FIG. 1A shows a front plan view of an opaque structure of the filter of FIG. 1.
Figure 2:
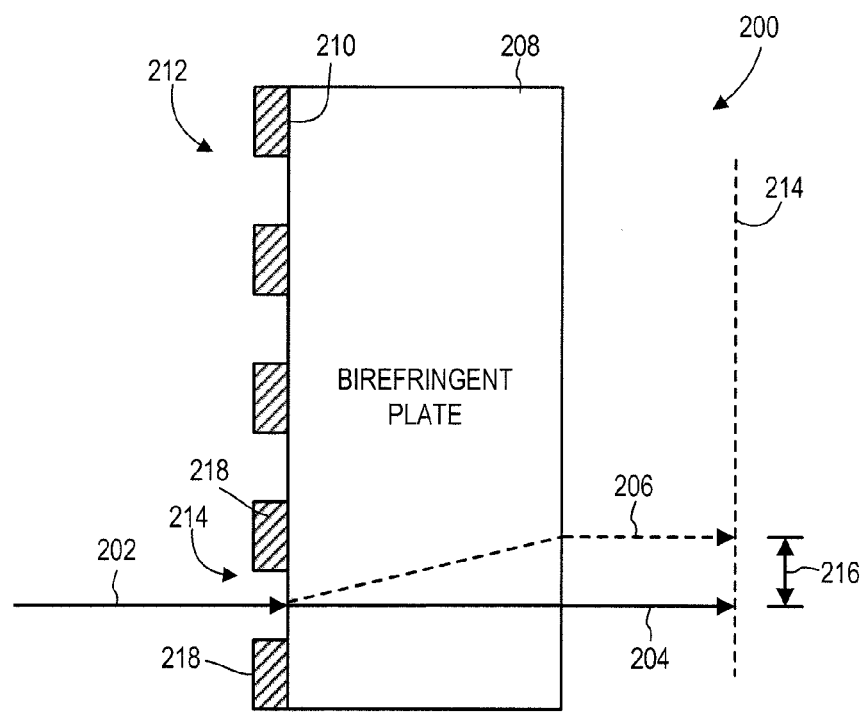
FIG. 2 shows one embodiment of the filter of FIG. 1.

Opaque structure 112's plurality of apertures 118 includes, for example, a pinhole array, such as shown in FIG. 1A, which shows a front plan view of opaque structure 112. However, opaque structure 112 and/or plurality of apertures 118 may have other configurations. For example, opaque structure 112 could have a shape other than rectangular (e.g., circular). As another example, plurality of apertures 118 may include a random array of apertures or a Ronchi ruling, such as shown in FIG. 2, which is a cross sectional view of a birefringent filter 200. Filter 200, which is an embodiment of birefringent filter 100 (FIG. 1), includes a birefringent plate 208 and an opaque structure including a Ronchi ruling 212 disposed on a surface 210 of plate 208. Ronchi ruling 212 is, for example, disposed orthogonal to a birefringence refraction plane of birefringent plate 208. Ronchi ruling 212 could alternately be displaced from surface 210.

Figure 2A:
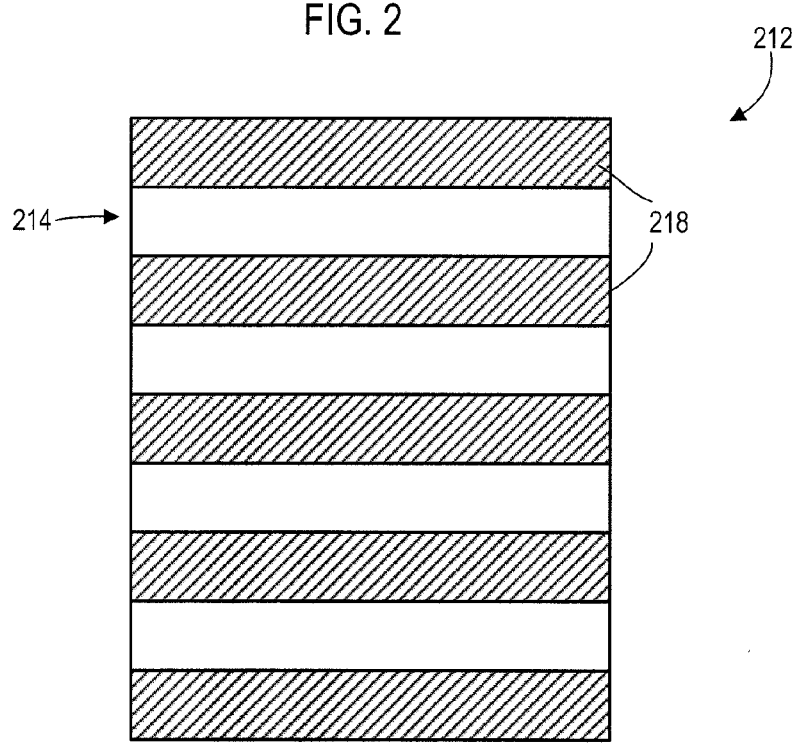
FIG. 2A shows a front plan view of a Ronchi ruling of the filter of FIG. 2.

FIG. 2A shows a front plan view of Ronchi ruling 212. Ronchi ruling 212 includes an alternating pattern of opaque lines 218 and clear apertures or slits 214. Ronchi ruling 212 is, for example, formed of chrome on glass and has a 50% duty cycle of opaque lines 218 and slits 214. The duty cycle and thickness of the birefringent plate 208 may be adjusted to minimize crosstalk. It may be advantageous for separation 216 between exiting rays 204 and 206 to equal the pitch of Ronchi ruling 212 to allow the image to completely fill a focal plane 214 without dead bands. As shown in FIG. 2, ray a 202 incident on a slit 214 in Ronchi ruling 212 is separated into an ordinary ray 204 and an extraordinary ray 206.

Examples of the birefringent material of plate 108 include calcite, quartz, zinc selenide, cadmium sulfide, and cadmium selenide. Calcite may be particularly suited for visible light applications or for 0.13 μm ultraviolet through 2.1 μm short wave infrared applications. For example, a 0.46 mm thick birefringent plate may produce a separation between an ordinary/extraordinary line pair of 50 μm, and may be paired with a Ronchi ruling have 50 μm slits. Cadmium sulfide may be particularly suited for infrared light applications. For example, a 0.9 mm thick cadmium sulfide birefringent plate may also produce a separation between an ordinary/extraordinary line pair of 50 μm.

Figure 3:
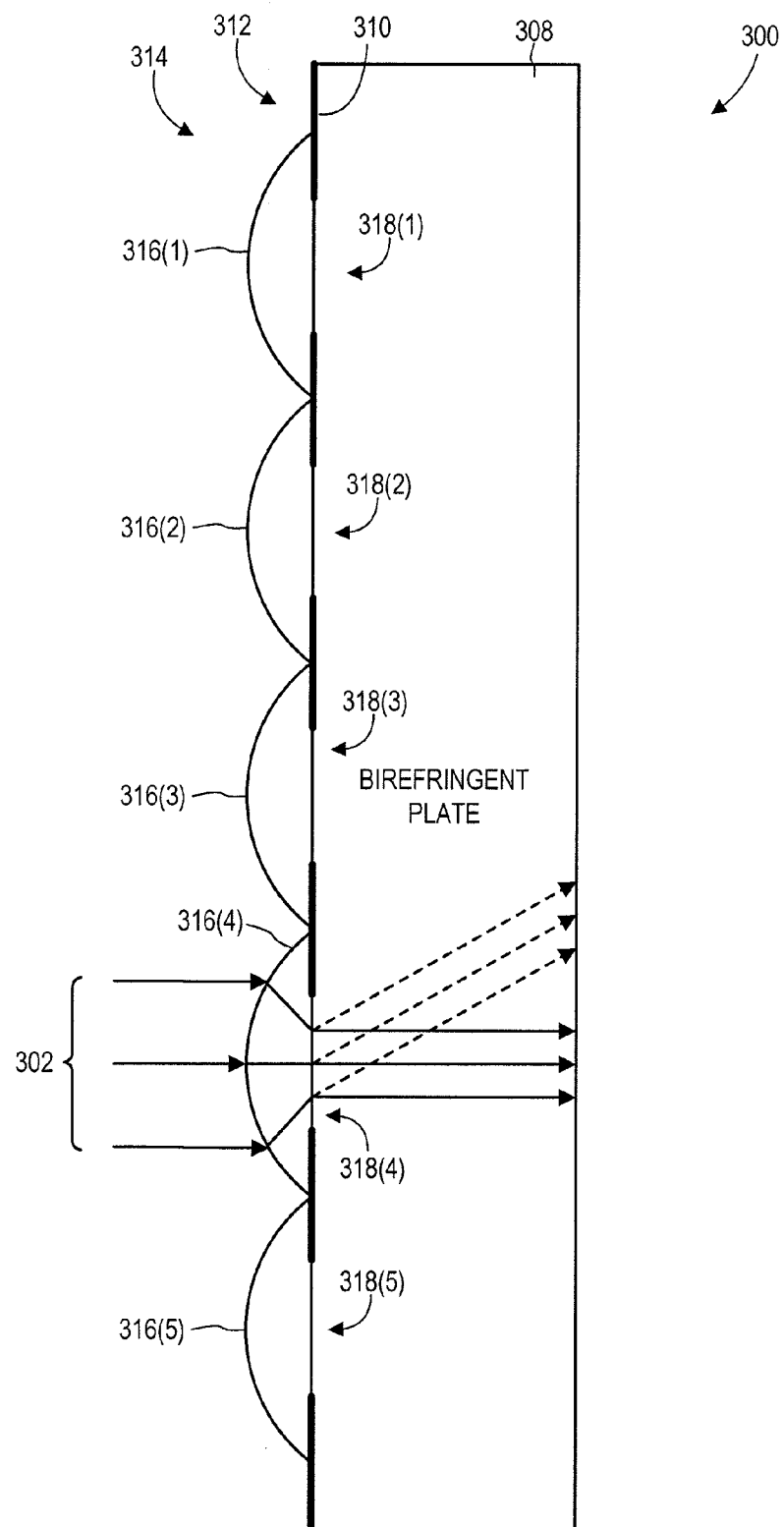
FIG. 3 shows another embodiment of the filter of FIG. 1.

Opaque structure 112 (FIG. 1) blocks light and thereby reduces the throughput of filter 100. In particular, only light that is incident on an aperture in opaque structure 112 passes through birefringent filter 100. This throughput reduction can be addressed by imaging additional frames on focal plane 114. Alternately or additionally, optics, such as an array of lenslets, may be disposed on opaque structure 112. For example, FIG. 3 shows a cross-sectional view of birefringent filter 300, which is an embodiment of filter 100. Birefringent filter 300 includes a birefringent plate 308 and a Ronchi ruling 312 formed on a surface 310 of plate 308. A lenslet array 314 is disposed on Ronchi ruling 312.

Lenslet array 314 includes a cylindrical lens or lenslet 316 for each slit 318 of Ronchi ruling 312. As shown in FIG. 3, lenslets 316 help capture incident rays 302 that would not otherwise be incident on a slit 318. Lenslets 316, for example, funnel photons down to a half of the number of pixels used to capture the orthogonal polarization on a neighboring rows of pixels of a detector at a focal plane. At visible and near infrared wavelengths, lenslets 316 may be fabricated by molding or embossing plastic or glass. For example, lenslets 316 may be molded or embossed into a single side of a sheet of plastic. At infrared wavelengths, lenslets 316 are, for example, molded of chalcogenide glass or etched into silicon or germanium. Lenslets 316 may also be fabricated as a fresnel lens.

As discussed above, filter 100 can include a lens array, or other EM directing element, in place of, or in addition to, opaque structure 112. Accordingly, filter 300 could be modified to remove Ronchi ruling 312.

Figure 4:
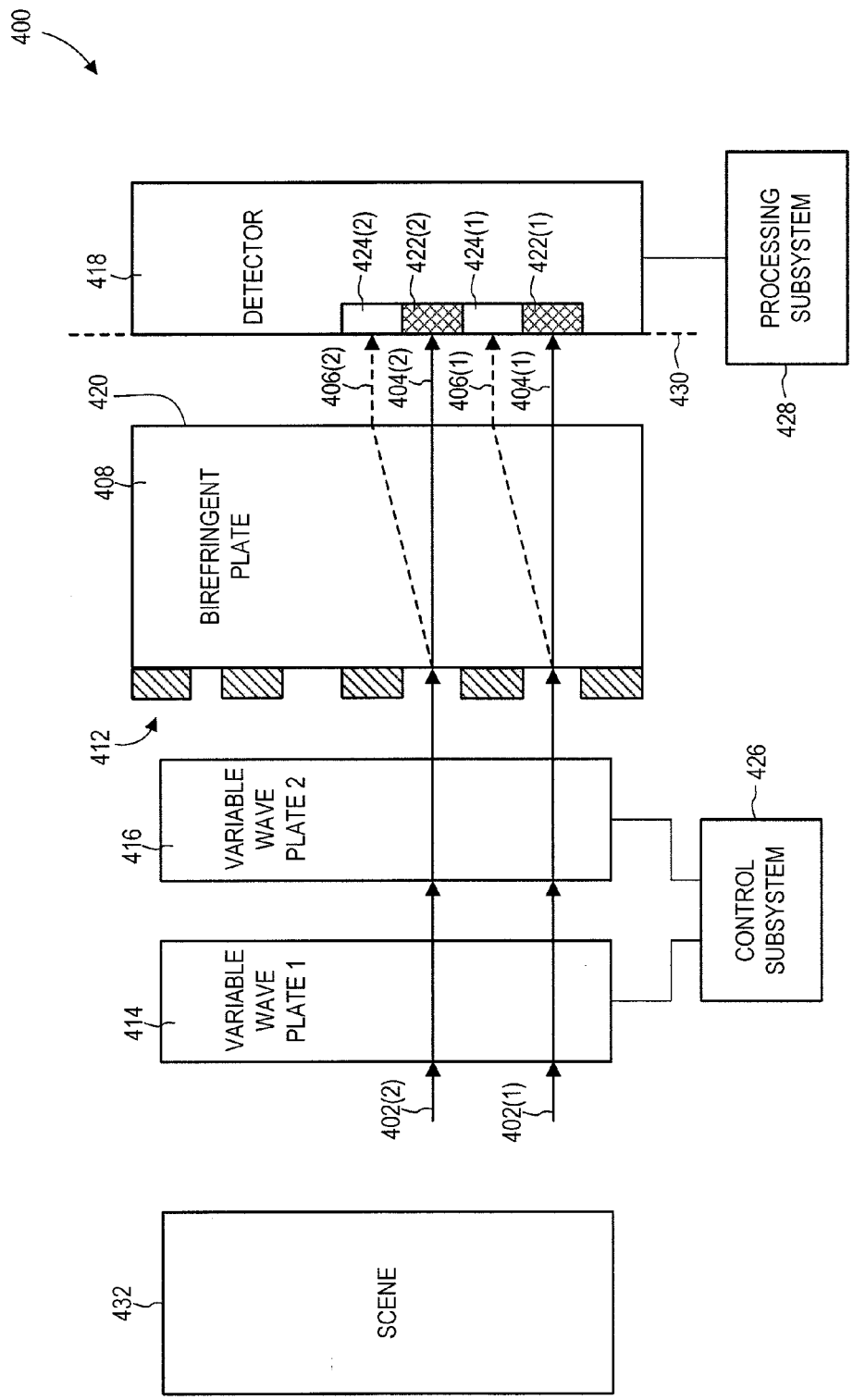
FIG. 4 shows one polarimetric imager, according to an embodiment.

FIG. 4 shows one polarimetric imager 400 including an embodiment of filter 100 and a detector 418 at a focal plane 430. Specifically, imager 400 includes a birefringent plate 408, an opaque structure 412, and detector 418 in optical alignment with a second side 420 of birefringent plate 408. Examples of detector 418 include a charge coupled device (CCD) detector and a complimentary metal oxide semiconductor (CMOS) detector. Imager 400 optionally includes processing subsystem 428 communicatively coupled to detector 418 for processing data generated by detector 418. Although opaque structure 412 is shown as including a Ronchi ruling, opaque structure 412 could have another configuration, such as pinhole array or a Ronchi ruling including a lenslet array. Additionally, in some embodiments of imager 400, opaque structure 412 is omitted and processing subsystem 428 separates overlapping images generated by detector 418. Furthermore, opaque structure 412 could be replaced with, or supplemented with, another EM directing element, such as a lens array.

The filter of imager 400 optionally includes a first wave plate 414 and a second wave plate 416. Each of wave plates 414, 416 may be variable wave plates, such as shown in FIG. 4. However, at least one of wave plates 414, 416 could be a fixed wave plate, such as a circular wave plate. Embodiments including one or more variable wave plates optionally include a control subsystem 426 communicatively coupled with and controlling the wave plates, such as shown in FIG. 4. Although control subsystem 426 and processing subsystem 428 are shown as separate subsystems, they may be embodied by a single subsystem, such as a computer controlling imager 400.

Imager 400 is operable to simultaneously generate two orthogonally polarized images from a scene 432. In particular, if wave plates 414, 416 are not present, the birefringent filter separates incoming rays 402 from scene 432 into respective ordinary rays 404 (p-polarization) and extraordinary rays 406 (s-polarization). Ordinary rays 404 impinge pixels 422 to form a first image, and extraordinary rays 406 impinge pixels 424 to form a second image on detector 418. The first and second images are thus interlaced on detector 418 and are advantageously permanently aligned, thereby minimizing co-registration issues. The first and second images may also be simultaneously read-out to eliminate temporal distortions. To limit crosstalk to a fraction of a percent or less at the expense of image pixel count, a buffer band of pixels can be included in detector 418 between polarization lines of data (e.g., between pairs of pixels 422, 424). Although FIG. 4 shows a number of incoming rays 402, imager could be used in applications where scene 432 emits a single ray 402.

Accordingly, imager 400 can advantageously collect electronic images and electromagnetic information at different polarizations simultaneously on a single two-dimensional (2D) focal plane array (i.e., detector 418) without scanning or moving parts. Thus, imager 400 may be cheaper, smaller, lighter, and/or more reliable than other polarimetric imagers. The filter (i.e., birefringent plate 408 and opaque structure 412 and/or another EM directing element) can advantageously be permanently aligned with detector 418. A three- (or four-) dimensional data cube, x, y, $p_1$, and $p_2$ (representing orthogonal polarization states) may be simultaneously collected and optionally processed by processing subsystem 428. Imager 400 is not limited to visible light applications. Imager 400, for example, can be used in wave bands for which 2D detectors are available, including UV, visible, near infrared ("NIR"), mid-wave infrared ("MWIR"), long-wave infrared ("LWIR"), and millimeter wave band ("MMW") wave bands.

Incoming rays, such as from scene 432, may be partially polarized, as well as linearly or circularly polarized. The Stokes vector, S, may be used to describe partially polarized light in terms of its total intensity. As is known in the art, the Stokes vector includes elements $S_0$, $S_1$, $S_2$, and $S_3$, which can be computed as follows.

$$S_0 = I_0 + I_{90} \quad (1)$$

$$S_1 = I_0 - I_{90} \quad (2)$$

$$S_2 = I_{45} - I_{-45} \quad (3)$$

$$S_3 = I_L - I_R \quad (4)$$

$I_0$ and $I_{90}$ are the linear polarization intensities in an orthogonal coordinate system, $I_{45}$ and $I_{-45}$ are the linear polarization intensities along axes that are rotated by 45° with respect to the original coordinate system, and $I_L$ and $I_R$ are the intensities of the left and right circular polarization components of the light beam, respectively. Accordingly, the entire Stokes vector can be determined from $I_0$, $I_{90}$, $I_{45}$, $I_{-45}$, $I_L$, and $I_R$.

The first and second images generated by detector 418 without wave plates 414 and 416 present respectively correspond to $I_0$ and $I_{90}$. Optional wave plates 414, 416 enable imager 400 to additionally generate first and second images respectively corresponding to $I_{45}$ and $I_{-45}$, and/or $I_L$ and $I_R$. Wave plates 414, 416 are, for example, variable wave plates operable to phase shift rays passing therethrough in accordance with a control signal, such as an electrical control signal from control subsystem 426. For example, wave plates 414, 416 may each be an electrically controlled liquid crystal rotator that allows light to pass therethrough without phase shift when an electrical signal is applied and that acts as a quarter wave plate when no electrical control signal is applied. Other examples of wave plates 414, 416 include electro-optic rotators, kerr cells, and pockels cells.

In the example of FIG. 4, wave plate 414 is disposed such that it is in optical alignment with opaque structure 412. Second wave plate 416 is disposed between and in optical alignment with first variable wave plate 414 and opaque structure 412. First wave plate 412, for example, has a vertically aligned fast axis, and second wave plate 416 has a fast axis that is angularly displaced by forty five degrees from the fast axis of first wave plate 414.

Wave plates 414, 416 are, for example, variable wave plates that are independently controlled by control subsystem 426. For example, control subsystem 426 can provide signals (e.g., electrical signals) independently switching wave plates 414, 416 between a zero phase shift operating mode and quarter wave plate operating mode. As another example, control subsystem 426 may be operable to adjust variable wave plates 414, 416 to maximize polarization contrast of the first or second images generated by detector 418.

TABLE 1 below summarizes three different combinations of operating modes of an embodiment including wave plates 414, 416 that are variable wave plates. In operating mode 1, both wave plates 414, 416 are operated such that they introduce no phase shift. Accordingly, detector 418 forms first and second images respectively corresponding to $I_0$ and $I_{90}$. In operating mode 2, both wave plates 414, 416 act as quarter wave plates, and detector 418 forms first and second images respectively corresponding to $I_{45}$, and $I_{-45}$. In operating mode 3, first wave plate 414 does not introduce phase shift while second wave plate acts a quarter wave plate. In operating mode 3, detector 418 forms first and second images respectively corresponding to $I_L$, and $I_R$. TABLE 1 only summarizes some possible operating modes of an embodiment of imager 400—other operating modes are possible.

TABLE 1

| Operating Mode | $1^{st}$ Wave Plate | $2^{nd}$ Wave Plate | Measured at detector |
| --- | --- | --- | --- |
| 1 | no phase shift | no phase shift | $I_0$ and $I_{90}$ |
| 2 | quarter wave | quarter wave | $I_{45}$ and $I_{-45}$ |
| 3 | no phase shift | quarter wave | $I_L$ and $I_R$ |

Accordingly, an embodiment of imager 400 can be operated, such as by control subsystem 426, to generates sets of first and second images at each of operating modes 1-3. For example, the embodiment of imager 400 can be operated in each of modes 1, 2, and 3 to generate a set of images corresponding to (1) $I_0$ and $I_{90}$, (2) $I_{45}$ and $I_{-45}$, and (3) $I_L$ and $I_R$. Thus, embodiments of imager 400 including variable wave plates 414, 416 can be used to determine the entire Stokes vector by capturing just three image frames. Additionally, if it is expected that no circular polarized rays are to be emitted from the scene 432, mode 3 can be eliminated and stokes vector component $S_3$ can assumed to be zero, thus reducing the frames needed to two.

Optional processing subsystem 428 is operable to process first and second images generated by detector 418. Processing subsystem 428 may be implemented by a general purpose or specialized computer including a processor that executes instructions, such as in the form of software or firmware stored on a computer readable medium, to process images from detector 418. Processing subsystem 428, for example, digitally separates data from detector 418 to separate the first and second images. Processing subsystem 428 could, for example, subtract or ratio the first and second images to provide polarization discrimination information. As another example, processing subsystem 428 could be operable to sum the first and second images to yield intensity.

Processing subsystem 428, for example, can display or analyze polarization data in an acceptable manner once first and second images are collected from detector 418. For example, in human vision applications of imager 400, the three Stokes vector parameters $S_1$, $S_2$, and $S_3$ may be represented as false colors. As another example, the degree of polarization, p, may be displayed as a false color superimposed on a monochrome display of $S_0$. Alternately, the polarization states of the image may be represented as points mapped on a Poincaré sphere.

Processing subsystem 428 is, for example, operable to process first and second images generated by detector 418 to determine at least some elements of the Stokes vector, S, or another polarization characterization system. For example, processing subsystem 428 may be operable to calculate the Stokes vector using equations (1)-(4) above with input data including pairs of first and second images generated from each of operating modes 1-3 of TABLE 1 above.

Some embodiments of processing subsystem 428 are advantageously operable to adjust or remove information from an image of scene 432 using polarization information from sets of first and second images generated by detector 418. For example, in a forest scene, light emitted from a tree canopy may be non-polarized, and processing subsystem 428 may remove the tree canopy from an image of the forest scene by removing non-polarized portions of the image.

Some embodiments of processing subsystem 428 are also operable to identify a target in scene 432. Polarization of objects is related to planar surfaces of the objects, and such planar surfaces can often indicate whether the objects are man-made. Accordingly, processing subsystem 428 could, for example, use polarization information to discriminate a man-made object from more natural clutter in scene 432. As another example, processing subsystem 428 could be operable to detect illumination in a scene from a polarized laser source, as opposed to illumination from a natural, or other, light source.

Some embodiments of imager 400 can advantageously be integrated with an acceptable detector or focal plane array (FPA) without alteration to the FPA. Adjacent lines on the FPA may carry identical spatial information, but with different orthogonal polarizations. Some embodiments of imager 400 may also be: (i) used to form framing cameras that can run kHz rates; (ii) integrated into miniature cameras and/or disposable cameras; or (iii) used in infrared cameras.

Possible uses of some embodiments of imager 400 may include one or more of the following:
1. Identifying targets in clutter.
2. Identifying man-made objects, such as those camouflaged or those located in high-glare littoral (marine) environments.
3. Detecting buried landmines, such as by identifying man-made objects and/or disturbed soils.
4. Characterizing materials, including agricultural and food materials.
5. Enhancing contrast in biomedical and pharmaceutical applications, such as enhancing mammograms and other subsurface (soft) tissue images.
6. Locating laser light.
7. Replacing a polarizer analyzer pair conventionally used in microscopes to measure the polarization of samples under the microscope.
8. Measuring thin film thickness using ellipsometry.
9. Inspecting glass and glass bottles during manufacturing.
10. Measuring optical properties of a material, including linear birefringence, circular birefringence (also known as optical rotation or optical rotary dispersion), linear dichroism, circular dichroism, and scattering.
11. Measuring polarization of light from an external light source and reflected from or transmitted through a sample as well as the fluorescence, phosphorescence, or luminescence of light generated by a sample.

Advantages of some embodiments of the imager 400 may include one or more of the following:
1. Only one detector is required to obtain two polarization states.
2. Two polarization states may be simultaneously recorded on a single detector.
3. An entire Stokes vector can be recorded by using wave plates 414, 416 before birefringent plate 408.
4. Motion artifacts may be reduced or eliminated due to simultaneous generation of the first and second images.
5. Some embodiments of imager 400 operate in the infrared band, thereby minimizing the need for expensive infrared-band focal plane arrays.
6. Some embodiments of imager 400 can be mounted in a filter wheel and can be swung in and out of the image stream to interchange with other imaging systems.
7. As discussed below, some embodiments of imager 400 can be combined with a dispersive element (e.g., in a HyperPixel Array imager) to provide both polarimetric and spectral data in an image.
8. Some embodiments of imager 400 can be disposed adjacent to a detector without requiring a reimaging lens.
9. Some embodiments of imager 400 can be coupled to a detector using a short lens array or a grin lens array (Selfoc).
10. Some embodiments of imager 400 can be used in a projection system to project polarimetric scenes.
11. Some embodiments of imager 400 can incorporate a detector 418 smaller than a typical FPA array, such as a two- or three-pixel detector.
12. Some embodiments of imager 400 can be used to project polarized light and images in both linear and circular polarization states.
13. Some embodiments of imager 400 can be used to measure circularly polarized light.

Figure 5:
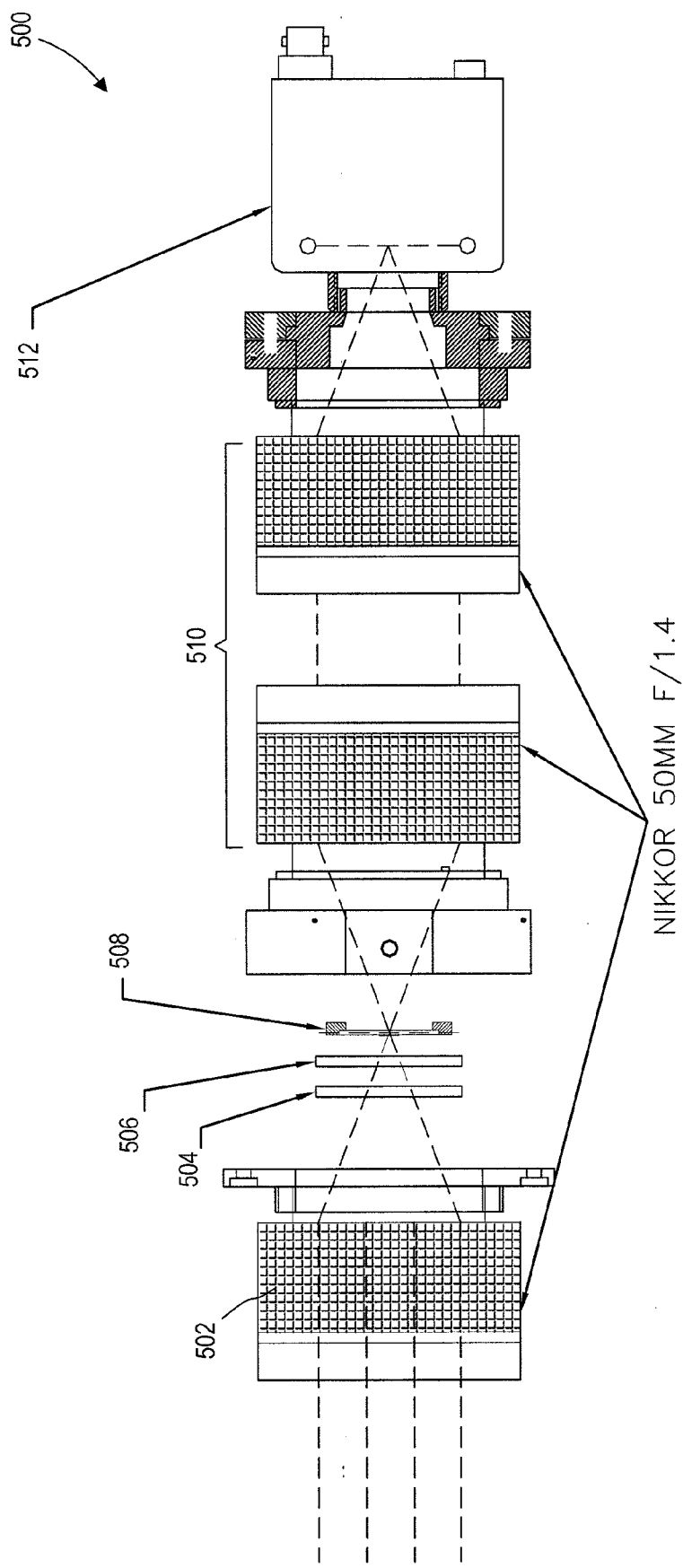
FIG. 5 shows one embodiment of the polarimetric imager of FIG. 4.

FIG. 5 shows a side plan view of one imager 500, which is an embodiment of imager 400 (FIG. 4). Imager 500 includes a primary lens 502 (e.g., a camera lens, such as a Nikkor 50 MM F/1.4 lens as shown in FIG. 5), a first variable wave plate 504, a second variable wave plate 506, a filter 508 (which is an embodiment of filter 100, FIG. 1), an optical relay 510, and a detector 512, which is, for example, a CCD or CMOS detector. Primary lens 502 can be interchanged with another lens to vary the field of view. Orthogonal polarization state images can be read out simultaneously from a single array of detector 512. As discussed below, optical relay 510 can optionally be eliminated by coupling filter 508 directly to detector 512, such as using a Selfoc lens array relay. (A Selfoc lens array is a GRIN lens image relay system developed for copying machines). Furthermore, filter 508 may be contact-coupled to detector 512.

Figure 8:
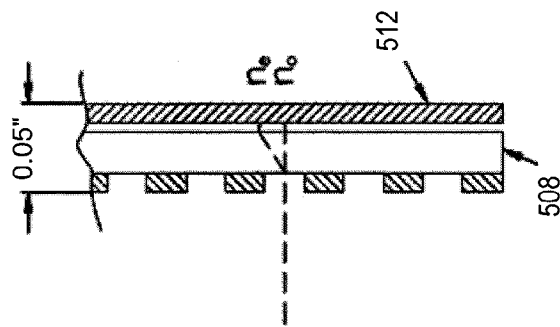
FIG. 8 shows another alternative embodiment of the polarimetric imager of FIG. 5.
Figure 7:
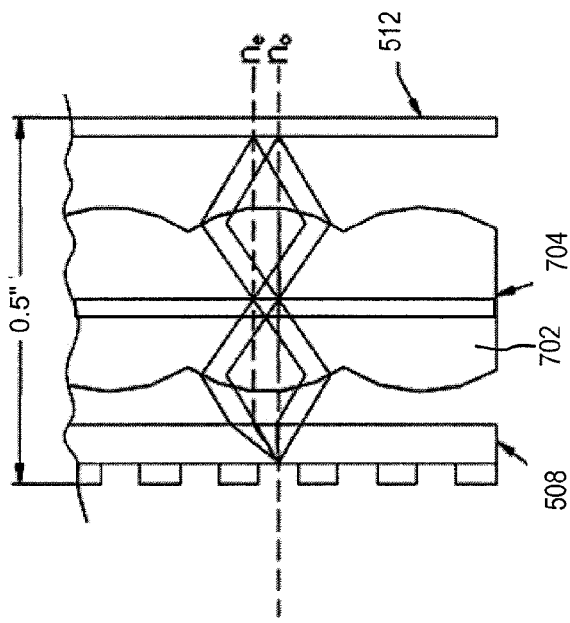
FIG. 7 shows another alternative embodiment of the polarimetric imager of FIG. 5.
Figure 6:
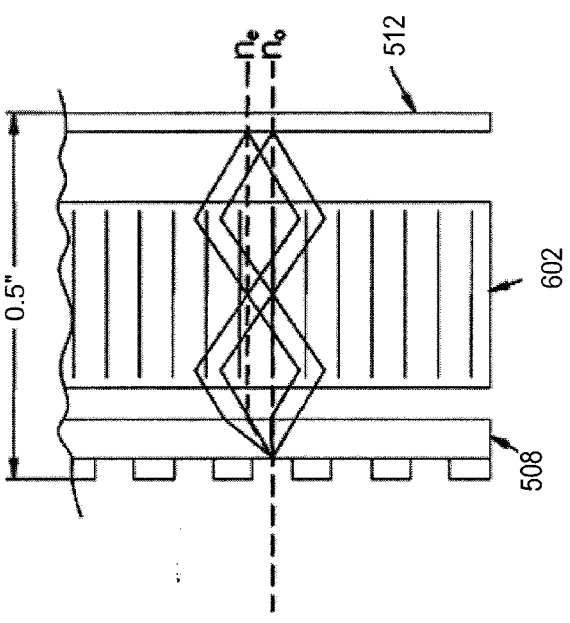
FIG. 6 shows an alternative embodiment of the polarimetric imager of FIG. 5.

FIGS. 6-8 show several possible manners of integrating filter 508 with detector 512. The embodiments shown in FIGS. 6-8 may advantageously be utilized to allow an assembly including filter 508 and detector 512 to be relatively compact.

FIG. 6 is a cross sectional view of filter 508 coupled to detector 512 using a Selfoc lens array relay 602. FIG. 7 is a cross sectional view of filter 508 coupled to detector 512 using a double lenslet array relay 702. A field lens 704 is optionally disposed in the middle of lenslet array 702. FIG. 8 is a cross sectional view of filter 508 directly coupled to detector 512.

Figure 9:
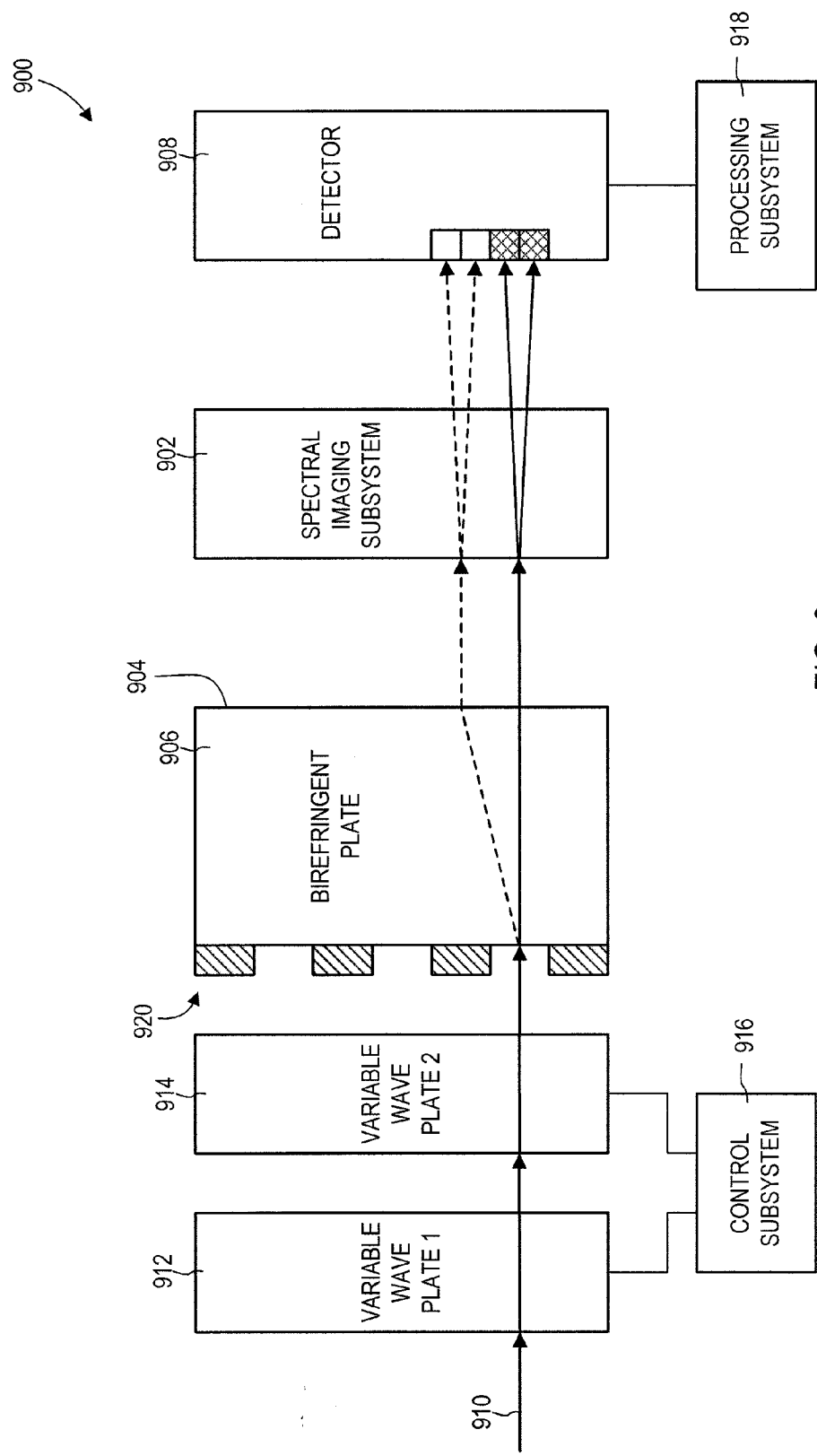
FIG. 9 shows an embodiment of the polarimetric imager of FIG. 4 including a spectral imaging subsystem.

Some embodiments of imager 400 are operable to detect spectral information in addition to polarization and intensity information. For example, FIG. 9 shows one imaging system 900, which is an embodiment of imaging system 400 including spectral imaging subsystem 902. Spectral imaging subsystem 902 is operable to separate ordinary and extraordinary arrays emerging from surface 904 of birefringent plate 906 according to their spectral content. Accordingly, detector 908, which is, for example, angularly displaced by 90 degrees from the direction of dispersion of spectral imaging subsystem 902, forms a plurality of images that represent both polarization and spectral characteristics of rays 910 emitted from the scene. Spectral imaging subsystem 902, for example, includes a dispersive element such as a prism, or is a hyperspectral imaging subsystem, such as disclosed in U.S. Patent Application Publication No. 2008/0088840 to Bodkin et al., which is incorporated herein by reference.

Figure 9A:
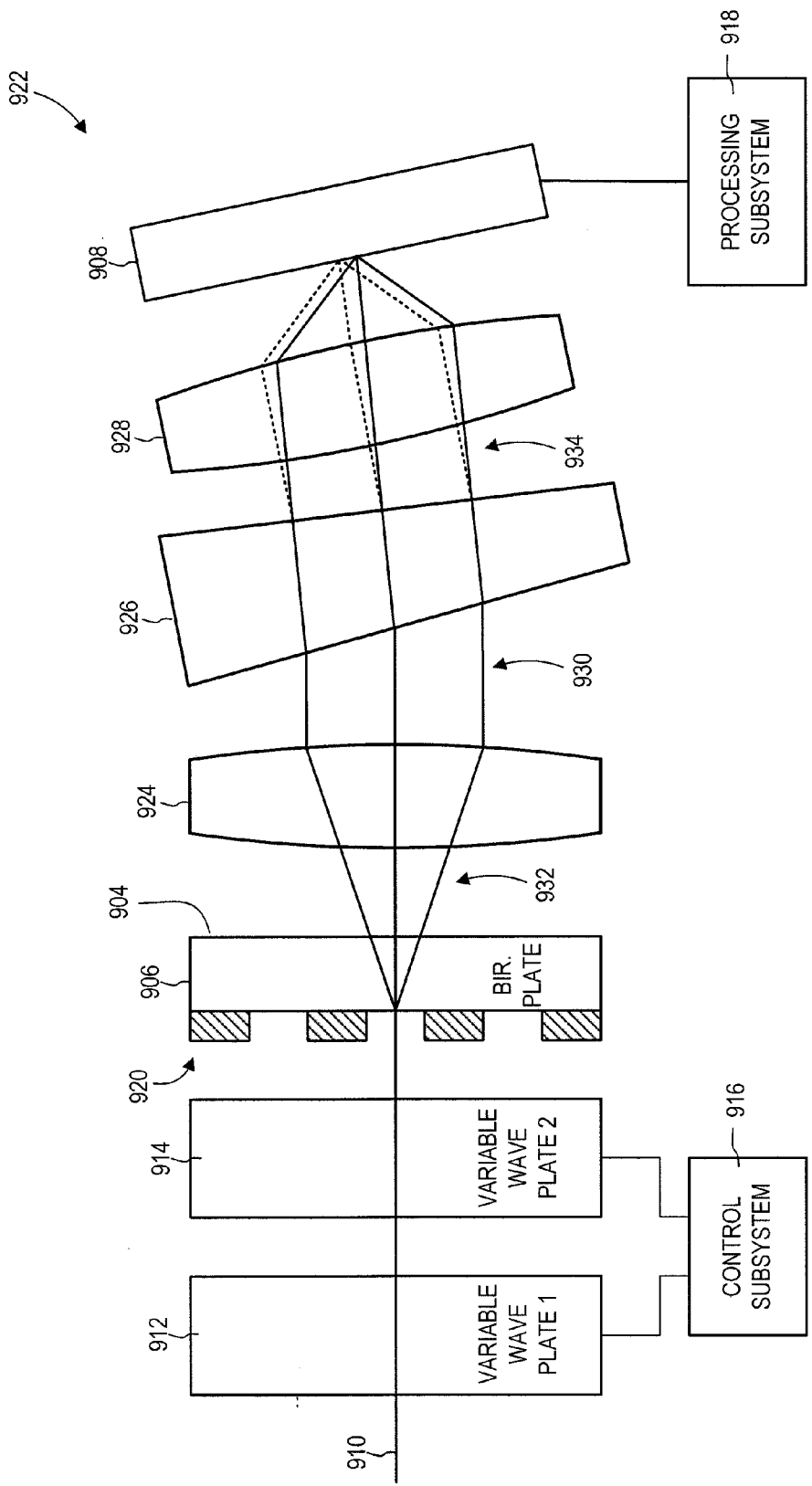
FIG. 9A shows an imaging system including a hyperspectral imaging subsystem, according to an embodiment.

For example, FIG. 9A shows an imaging system 922, which is one possible implementation of imaging system 900 including a hyperspectral imaging subsystem. Imaging system 922 includes a collimating lens 924, a dispersive element 926, and a focusing lens 928. Collimating lens 924 is in optical alignment with birefringent plate surface 904 and collimates ordinary and extraordinary rays emerging from surface 904 into collimated rays 930. The ordinary and extraordinary rays emerging from surface 904 are collectively shown as rays 932 in FIG. 9A to promote illustrative clarity. Dispersive element 926 is in optical alignment with collimating lens 924 and separates collimated rays 930 into spectrally separated rays 934 according to their spectral content. Dispersive element 926 includes, for example, a prism. Focusing lens 928 is in optical alignment with both dispersive element 926 and detector 908, and focusing lens 928 focuses spectrally separated rays 934 onto detector 908.

Figure 9B:
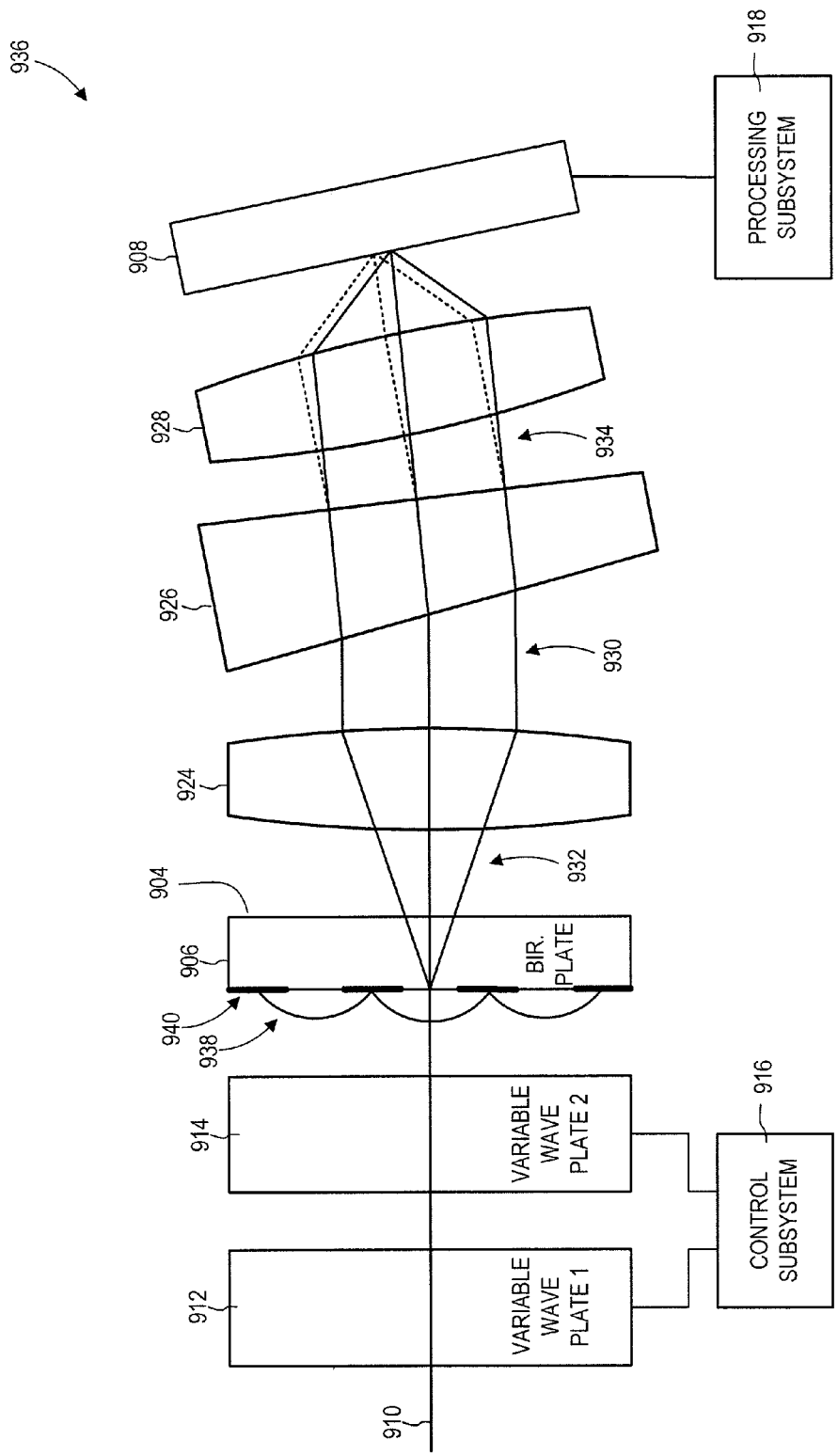
FIG. 9B shows another imaging system including a hyperspectral imaging subsystem, according to an embodiment.
Figure 9C:
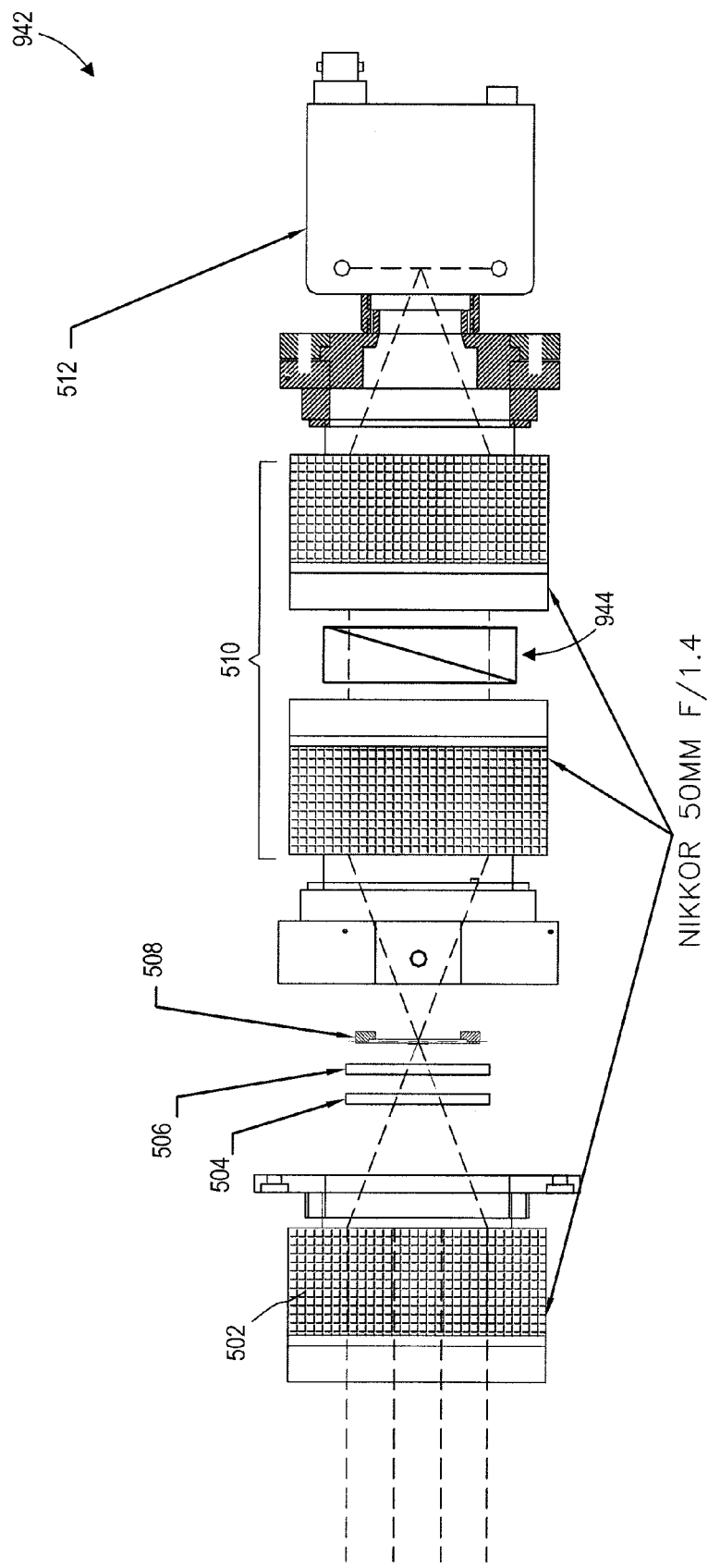
FIG. 9C shows a polarimetric imager like that of FIG. 5, but where the optical relay further includes a dispersive element, according to an embodiment

As another example, FIG. 9B shows an imaging system 936, which is like imaging system 922 of FIG. 9A, but with opaque structure 920 replaced with lenslet array 938 disposed on an aperture array 940. As yet another example, FIG. 9C shows an imaging subsystem 942, which is like imager 500 of FIG. 5, but where optical relay 510 further includes a dispersive element 944.

The configuration of imager 900 can be varied from the example of FIG. 9. For example, wave plates 912, 914, control subsystem 916, and/or processing subsystem 918 could be omitted. Also, at least one of wave plates 912, 914 could be a fixed wave plate instead of a variable wave plate. Furthermore, although opaque structure 920 is shown as including a Ronchi ruling, opaque structure 920 could have another configuration (e.g., could include a pinhole array, a lenslet array on a Ronchi ruling, or a hardware coded aperture array). Opaque structure 920 could be replaced with, or supplemented with, another EM directing element, such as a lens array.

Figure 10:
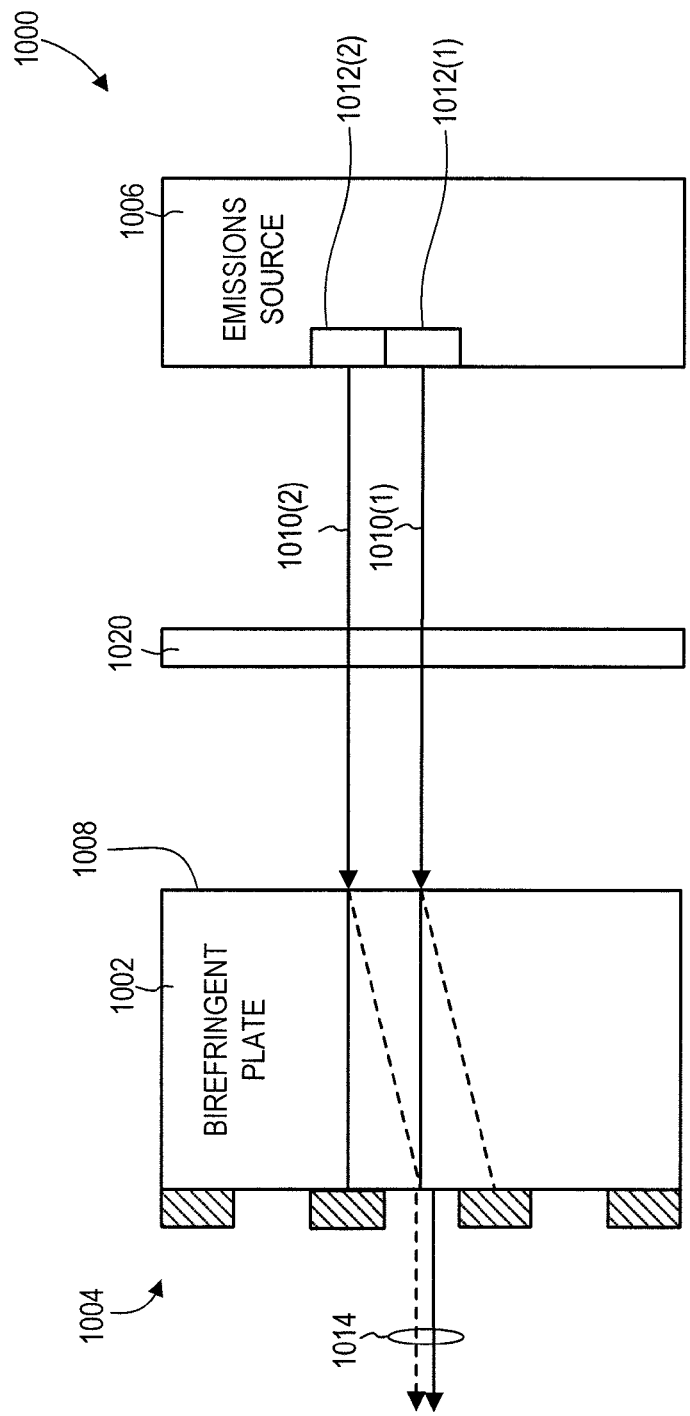
FIG. 10 shows one projection system, according to an embodiment.

Embodiments of filter 100 can also be used to filter polarization information from an electromagnetic energy emissions source, such as for use in projecting photons having certain polarization. For example, projection system 1000 of FIG. 10 includes a birefringent plate 1002, an opaque structure 1004 (e.g., a Ronchi ruling as shown in FIG. 10), and an electromagnetic emissions source 1006 in optical alignment with a surface 1008 of plate 1002. Emissions source 1006 is, for example, a light source, an infrared energy source, or a mid wave band energy source. Opaque structure 1004 could be replaced with, or supplemented with, another EM directing element, such as a lens array. Imaging system 1100 may also include one more additional optics, such as a lens 1020.

Emissions source 1006 is, for example, a light source such as a liquid crystal array with its polarizers rotated at 45 degrees with respect to a plane of birefringent plate 1002, one or more light emitting diodes, or a polarized light source. In the example of FIG. 10, projection system 1000 filters rays 1010 from pixels 1012 of emissions source 1006 such that only s-polarized rays 1014 emerge from opaque structure 1004. According, in the example of FIG. 10, projection system 1000 projects s-polarized rays 1014. However, other embodiments of imaging system 1000 project p-polarized rays. Although emissions source 1006 is shown as including a plurality of pixels 1012, emissions source 1006 could be a single pixel source.

Projection system 1000 optionally further includes one or more wave plates and/or a spectral imaging subsystem. The wave plates allow further control of polarization of rays projected from system 1000. For example, a wave plate could be used to converter linear polarized rays into circularly polarized rays. The spectral imaging subsystem separates electromagnetic energy from emissions source 1006 according to wavelength and thereby allows control of the spectral content of rays projected from system 1000.

Figure 11:
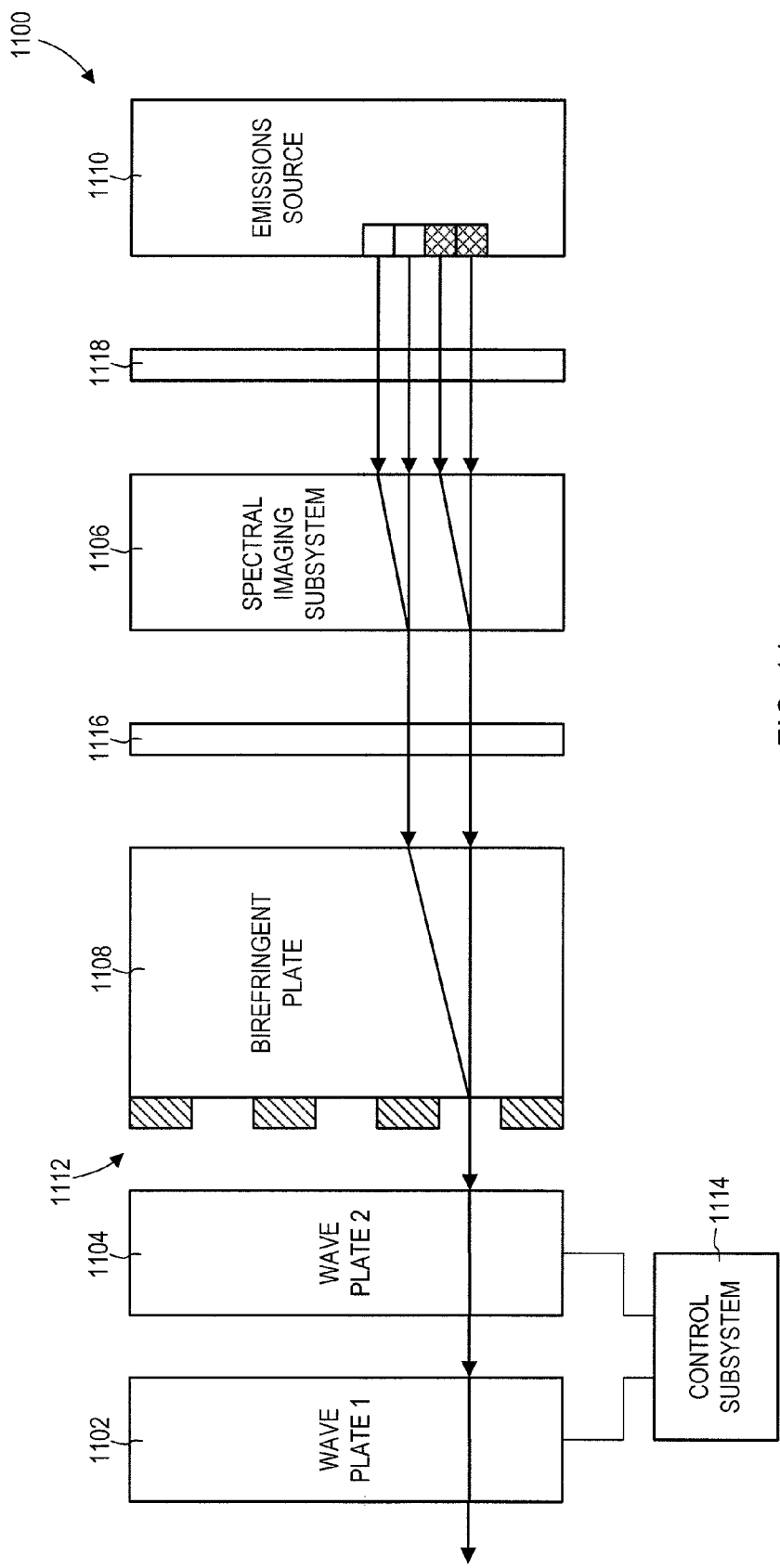
FIG. 11 shows one embodiment of the projection system of FIG. 10.

For example, FIG. 11 shows one projection system 1100, which is an embodiment of imaging system 1000 including a first wave plate 1102, a second wave plate 1104, and a spectral imaging subsystem 1106 (e.g., including a dispersive element such as a prism) disposed between and in optical alignment with a birefringent plate 1108 and an electromagnetic energy emissions source 1110. Emissions source 1110 is angularly displaced from the direction of dispersion of spectral imaging subsystem 1106 by 90 degrees, for example. First wave plate 1102 is in optical alignment with an opaque structure 1112. Second wave plate 1104 is disposed between and in optical alignment with first wave plate 1102 and opaque structure 1112. Wave plates 1102, 1104 are, for example, variable wave plates controlled by optional control subsystem 1114. In such embodiments, control subsystem 1114 may be operable to adjust the operating modes of wave plates 1102, 1104 to optimize an image projected by system 1100. Projection system 1100, for example, includes additional optics, such as lenses 1116, 1118. Additionally, opaque structure 1112 could be replaced with, or supplemented with, another EM directing element, such as a lens array.

Some embodiments of projection system 1000 (FIG. 10) could be used as a three dimension projector to interlace a stereoscopic pair onto a projection screen. For example, emissions source 1006 could be a single projector, and a viewer could wear polarized glasses (e.g., including a p-polarized lens and an s-polarized lens) and view a three dimensional image from exiting rays 1014. Such system would advantageously only require a single projector, in contrast to some other three dimensional projection systems that require at least two projectors.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A polarimetric imager, comprising:
    an optic for creating an image of a scene;
    an aperture array for separating rays of light originating from a plurality of different portions of the image of the scene into a respective plurality of spatially separated ray bundles;
    a birefringent plate for separating each of the plurality of spatially separated ray bundles into ordinary rays and extraordinary rays;
    a spectral imaging subsystem for separating the ordinary and extraordinary rays according to their spectral content; and
    a detector array for generating data from the ordinary and extraordinary rays separated according to their spectral content.

2. The polarimetric imager of claim 1, further comprising a processing subsystem communicatively coupled to the detector array for generating a data cube from the data generated by the detector.

3. The polarimetric imager of claim 1, the data comprising polarimetric data, spectral data, and spatial data, from the image of the scene.

4. The polarimetric imager of claim 1, the spectral imaging subsystem comprising a dispersive element.

5. The polarimetric imager of claim 4, the dispersive element comprising a prism.

6. The polarimetric imager of claim 1, the spectral imaging subsystem comprising a hyperspectral imaging subsystem.

7. The polarimetric imager of claim 6, the hyperspectral imaging subsystem comprising:
    a collimating lens in optical alignment with the birefringent plate;
    a dispersive element for receiving light from the collimating lens, the dispersive element being in optical alignment with the collimating lens; and
    a focusing lens for receiving light from the dispersive element, the focusing lens being in optical alignment with the dispersive element and the detector array.

8. The polarimetric imager of claim 7, the dispersive element comprising a prism.

9. The polarimetric imager of claim 7, the aperture array comprising a pinhole array.

10. The polarimetric imager of claim 7, the aperture array comprising lenslet array.

11. The polarimetric imager of claim 7, further comprising at least one wave plate in optical alignment with the aperture array.

12. The polarimetric imager of claim 11, the wave plate comprising two variable wave plates, the imager further comprising a control subsystem operable to independently adjust an operating mode of each of the variable wave plates to maximize polarization contrast in the data.

13. The polarimetric imager of claim 11, further comprising a control subsystem operable to control the wave plate.

14. The polarimetric imager of claim 13, further comprising a processing subsystem communicatively coupled to the detector array and operable to calculate polarization characteristics describing polarization of the image of the scene from data generated by the detector array at different operating modes of the wave plate.

15. The polarimetric imager of claim 14, the processing subsystem operable to clarify information from the image of the scene according to polarization information from the data generated by the detector array at different operating modes of the wave plate.

16. The polarimetric imager of claim 14, the processing subsystem operable to identify a target of interest in the image of the scene from the data generated by the detector at different operating modes of the wave plate.

17. A polarimetric imager, comprising:
    an optic for creating an image of a scene;
    a lenslet array for separating rays of light originating from a plurality of different portions of the image of the scene into a respective plurality of spatially separated ray bundles;
    a birefringent plate for separating each of the plurality of spatially separated ray bundles into ordinary rays and extraordinary rays;
    a spectral imaging subsystem for separating the ordinary and extraordinary rays according to their spectral content; and
    a detector array for generating data from the ordinary and extraordinary rays separated according to their spectral content.

18. The polarimetric imager of claim 17, the spectral imaging subsystem comprising:
    a collimating lens in optical alignment with the birefringent plate;
    a dispersive element for receiving light from the collimating lens, the dispersive element being in optical alignment with the collimating lens; and
    a focusing lens for receiving light from the dispersive element, the focusing lens being in optical alignment with the dispersive element and the detector array.

19. A method for simultaneously generating polarimetric image data, spectral image data, and spatial image data, from an image of a scene, comprising the steps of:
    separating rays of light originating from a plurality of different portions of the image of the scene into a respective plurality of spatially separated ray bundles;
    separating each of the plurality of spatially separated ray bundles into ordinary rays and extraordinary rays;
    collimating the ordinary and extraordinary rays into collimated rays; and
    separating each of the collimated rays into a plurality of spectrally separated rays according to their spectral content.

20. The method of claim 19, the step of separating the collimated rays comprising using at least one prism to separate the collimated rays according to their spectral content.

21. The method of claim 19, further comprising:
    focusing the spectrally separated rays onto a detector array; and generating a data cube from data generated by the detector array.

\* \* \* \* \*